United States Patent
Wittig et al.

(10) Patent No.: US 9,982,168 B2
(45) Date of Patent: May 29, 2018

(54) ADHESIVE TAPE BASED ON A STITCH-BONDED WEB CARRIER WITH BICOMPONENT FIBERS

(71) Applicant: Coroplast Fritz Müller GmbH & Co. KG, Wuppertal (DE)

(72) Inventors: Gülay Wittig, Bochum (DE); Guido Vorwerk, Warendorf (DE); Christoph Lodde, Holzwickede (DE)

(73) Assignee: Coroplast Fritz Müller GmbH & Co. KG, Wuppertal (DE)

( * ) Notice: Subject to any disclaimer, the term of this patent is extended or adjusted under 35 U.S.C. 154(b) by 163 days.

(21) Appl. No.: 14/757,696

(22) Filed: Dec. 23, 2015

(65) Prior Publication Data

US 2016/0177138 A1    Jun. 23, 2016

(30) Foreign Application Priority Data

Dec. 23, 2014    (DE) .................... 10 2014 119 524

(51) Int. Cl.
*C09J 7/02* (2006.01)
*C09J 7/04* (2006.01)

(52) U.S. Cl.
CPC ............... *C09J 7/0285* (2013.01); *C09J 7/04* (2013.01); *C09J 2203/302* (2013.01); *C09J 2400/263* (2013.01); *C09J 2467/006* (2013.01)

(58) Field of Classification Search
CPC ..................................... C09J 7/0285

USPC .......................................... 428/102
See application file for complete search history.

(56) References Cited

U.S. PATENT DOCUMENTS 6,451,146 B1 *  9/2002  Ganschow ................ C09J 7/04
                                                                156/164
2012/0129032 A1   5/2012  Greiner et al.
2012/0227894 A1   9/2012  Siebert et al.

FOREIGN PATENT DOCUMENTS

EP    0 668 336 B2    8/2001
EP    1990393         11/2008

OTHER PUBLICATIONS

European Search Report from corresponding European application No. EP 15 19 8561 dated Feb. 19, 2016 (2 pgs).
French Search Report from corresponding French application No. FR 1553597 dated Apr. 22, 2015 (5 pgs).

* cited by examiner

*Primary Examiner* — Brent T O'Hern
(74) *Attorney, Agent, or Firm* — Brinks Gilson & Lione (57) ABSTRACT

An adhesive tape having a carrier including a stitch-bonded web and an adhesive coating applied on at least one side of the carrier. The stitch-bonded web may contain fibers composed entirely from polyester (PES) and sewn by means of at least one sewing thread. The stitch-bonded web contains bicomponent fibers in addition to the fibers may be composed of PES.

15 Claims, 7 Drawing Sheets

Fig. 4    Table 2: Adhesive Tapes in Comparison

| Parameter | Unit | Coroplast 8550 | Standard Adhesive Tape 8550 X | Adhesive Tape According to the Invention |
|---|---|---|---|---|
| Carrier Material | g/m² | 80 | 80 | 80 |
| Type of Adhesive | - | rubber | acrylate | acrylate |
| Adhesive Application | g/m² | 50 – 100 | 50 – 100 | 30 – 80 |
| Thickness | mm | 0.3 | 0.3 | 0.3 |
| Elongation at Rupture | % | 30 | 22 | 18 |
| Breaking Force | N/cm | 37 | 32 | 27 |
| Adhesive Strength Steel | N/cm | 4.5 | 2.5 | 2.1 |
| Adhesive Strength Back of Tape | N/cm | 5.5 | 3.7 | 4.5 |
| Unrolling Force | N | 6.5 | 6.2 | 6.2 |
| Manual Tearability | LV 312 | easy | easy | very easy |
| Noise Attenuation Class | LV 312 | C | C | C |
| Abrasion Class | LV 312 | B | B | B/C |
| Temperature Class | LV 312 | 105 °C | 125 °C | 150 °C |
| Short-term Aging 125 °C | LV 312 | in order | in order | in order |
| Short-term Aging 150 °C | LV 312 | not in order rupture in adhesive tape | in order | in order |
| Short-term Aging 175 °C | LV 312 | not in order rupture in adhesive tape | not in order rupture in adhesive tape | in order |
| Chemical Resistance | LV 312 | limited | limited | good |

FIG. 5    Tabelle 5

| Coroplast 8550 | 2 x 0,35 mm² PP-Leitung mit Bewicklung | | | | | | | | | | | | | | | | | | | | | | | |
|---|---|---|---|---|---|---|---|---|---|---|---|---|---|---|---|---|---|---|---|---|---|---|---|---|
| Lagerungsdauer | 240h | | | | | | 480h | | | | | | 720h | | | | | | 1000h | | | | | |
| Mechanische Belastung/ Dorn Ø in mm | 20 | 20 U | 10 | 2 | 2 U | 20 | 20 U | 10 | 10 U | 2 | 2 U | 20 | 20 U | 10 | 10 U | 2 | 2 U | 20 | 20 U | 10 | 10 U | 2 | 2 U |
| Mehrbereichs-Motoröl; Engine oil Shell Helix 5W40 | i.o | i.o | i.o | i.o | i.o | i.o | i.o | i.o | i.o | i.o | i.o | i.o | i.o | i.o | n.i.o | i.o | n.i.o | i.o | i.o | n.i.o | n.i.o | n.i.o | n.i.o |
| Automatikgetriebeöl / Automatic gear box oil Liquid Moly ATF II | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Kühlerfrostschutz / radiator antifreeze 50% Ethylenglykol, 50% H₂O | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Intensivreiniger /Intensive cleaner 80% Isopropanol, 20% Polypropylenglykol | i.o | i.o | i.o | i.o | i.o | i.o | i.o | i.o | i.o | i.o | i.o | i.o | i.o | i.o | i.o | i.o | i.o | i.o | i.o | n.i.o | n.i.o | i.o | n.i.o |
| Motorkaltreiniger engine cold cleaner | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Motorraumversiegelung/ engine compartment preservative | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Schmierfett / Lubricating grease | i.o | i.o | i.o | i.o | i.o | i.o | i.o | i.o | i.o | n.i.o | n.i.o | i.o | i.o | i.o | n.i.o | n.i.o | n.i.o | i.o | i.o | n.i.o | n.i.o | n.i.o | n.i.o |
| Kraftstoff FAM B (DIN 51 604) Petrol acc. To DIN 51 604 | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Diesel nach DIN EN 590 Diesel fuel | i.o | i.o | i.o | i.o | i.o | i.o | i.o | i.o | i.o | i.o | i.o | i.o | i.o | i.o | n.i.o | i.o | i.o | i.o | i.o | i.o | i.o | i.o | i.o |
| Tausalzlösung 5 % Saline solution 5 % | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Batteriesäure/ Dichte 1,28 Battery Acid density 1,28 | n.i.o | n.i.o | i.o | i.o | i.o | n.i.o | n.i.o | i.o | n.i.o | i.o | i.o | n.i.o | n.i.o | i.o | n.i.o | i.o | i.o | n.i.o | n.i.o | i.o | i.o | i.o | i.o |
| RME / Biodiesel Plant-based methylester | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Bremsflüssigkeit DOT 4 Brake fluid DOT 4 | i.o | i.o | i.o | i.o | i.o | i.o | i.o | i.o | i.o | i.o | i.o | i.o | i.o | i.o | n.i.o | i.o | i.o | i.o | i.o | n.i.o | n.i.o | n.i.o | n.i.o |
| Kriechmittel/ Penetrating agent | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Lengetriebeöl /power steering oil | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |

[TN: Legends in Fig. 5 (Table 5): PP – Leitung mit Bewickilung = PP cable with wrapping; Lagerungsdauer = Storage Time; Petrol = Fuel; all other items include translation)

FIG. 6    Tabelle 6

| Coroplast 8550 X | 2 x 0,35 mm² PP-Leitung mit Bewicklung | | | | | | | | | | | | | | | | | | | | | | | |
|---|---|---|---|---|---|---|---|---|---|---|---|---|---|---|---|---|---|---|---|---|---|---|---|---|
| Lagerungsdauer | 240h | | | | | | 480h | | | | | | 720h | | | | | | 1000h | | | | | |
| | 20 | 20 U | 10 | 2 | 2 U | 10 U | 20 | 20 U | 10 | 2 | 2 U | 10 U | 20 | 20 U | 10 | 2 | 2 U | 10 U | 20 | 20 U | 10 | 2 | 2 U | 10 U |
| Mechanische Belastung/ Dom Ø in mm | i.o | i.o | i.o | i.o | i.o | i.o | i.o | i.o | i.o | i.o | i.o | i.o | i.o | i.o | i.o | i.o | n.i.o | i.o | i.o | i.o | n.i.o | n.i.o | n.i.o | 2 U |
| Mehrbereichs-Motoröl; Engine oil Shell Helix 5W40 | i.o | i.o | i.o | i.o | i.o | i.o | i.o | i.o | i.o | i.o | i.o | i.o | i.o | i.o | i.o | i.o | i.o | n.i.o | i.o | i.o | n.i.o | n.i.o | n.i.o | n.i.o |
| Automatikgetriebeöl / Automatic gear box oil  Liquid Moly ATF II | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Kühlerfrostschutz / radiator antifreeze 50% Ethylenglykol, 50% H2O | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Intensivreiniger /Intensive cleaner 80% Isopropanol, 20% Polypropylenglykol | i.o | i.o | i.o | i.o | i.o | i.o | i.o | i.o | i.o | i.o | i.o | i.o | i.o | i.o | i.o | i.o | i.o | i.o | i.o | i.o | n.i.o | i.o | n.i.o | i.o |
| Motorkaltreiniger engine cold cleaner | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Motorraumversiegelung/ engine compartment preservative | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Schmierfett / Lubricating grease | i.o | i.o | i.o | i.o | i.o | i.o | i.o | i.o | n.i.o | i.o | n.i.o | i.o | i.o | i.o | i.o | n.i.o | n.i.o | i.o | i.o | i.o | i.o | n.i.o | i.o | i.o |
| Kraftstoff FAM B (DIN 51 604) Petrol acc. To DIN 51 604 | i.o | i.o | i.o | i.o | i.o | i.o | i.o | n.i.o | n.i.o | i.o | i.o | i.o | i.o | i.o | i.o | i.o | i.o | i.o | i.o | i.o | i.o | i.o | i.o | i.o |
| Diesel nach DIN EN 590 Diesel fuel | i.o | i.o | i.o | i.o | i.o | i.o | n.i.o | i.o | n.i.o | i.o | i.o | i.o | i.o | n.i.o | i.o | i.o | i.o | i.o | i.o | i.o | i.o | i.o | i.o | i.o |
| Tausalzlösung 5% Saline solution 5 % | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Batteriesäure/ Dichte 1,28 Battery Acid density 1,28 | n.i.o | n.i.o | i.o | i.o | i.o | i.o | i.o | i.o | i.o | i.o | i.o | i.o | i.o | n.i.o | i.o | i.o | n.i.o | i.o | i.o | n.i.o | i.o | i.o | i.o | i.o |
| RME / Biodiesel Plant-based methylester | i.o | i.o | i.o | i.o | i.o | i.o | i.o | i.o | n.i.o | i.o | i.o | i.o | i.o | i.o | n.i.o | i.o | n.i.o | n.i.o | i.o | i.o | n.i.o | n.i.o | n.i.o | n.i.o |
| Brensflüssigkeit DOT 4 Brake fluid DOT 4 | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Kriechmittel/ Penetrating agent | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Lengetriebeöl /power steering oil | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |

[TN: Legends in Fig. 6 (Table 6): PP – Leitung mit Bewicklung = PP cable with wrapping; Lagerungsdauer = Storage Time; Petrol = Fuel; all other items include translation)

FIG. 7    Tabelle 7

| Klebeband mit Bi-Komponenten Faser Acrylat | 2 x 0,35 mm² PP-Leitung mit Bewicklung | | | | | | | | | | | | | | | | | | | | |
|---|---|---|---|---|---|---|---|---|---|---|---|---|---|---|---|---|---|---|---|---|---|
| Lagerungsdauer | 240h | | | | | | 480h | | | | | | 720h | | | | | | 1000h | | | |
| Mechanische Belastung/ Dorn Ø in mm | 20 | 20 U | 10 | 10 U | 2 | 2 U | 20 | 20 U | 10 | 10 U | 2 | 2 U | 20 | 20 U | 10 | 10 U | 2 | 2 U | 20 | 20 U | 10 | 10 U | 2 | 2 U |
| Mehrbereichs-Motoröl; Engine oil Shell Helix 5W40 | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Automatikgetriebeöl / Automatic gear box oil Liquid Moly ATF II | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Kühlerfrostschutz / radiator antifreeze 50% Ethylenglykol, 50% H₂O | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Intensivreiniger /Intensive cleaner 80% Isopropanol, 20% Polypropylenglykol | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Motorkaltreiniger engine cold cleaner | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Motorraumversiegelung/ engine compartment preservative | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Schmierfett / Lubricating grease | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Kraftstoff FAM B (DIN 51 604) Petrol acc. To DIN 51 604 | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Diesel nach DIN EN 590 Diesel fuel | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Tausalzlösung 5% Saline solution 5 % | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Batteriesäure/ Dichte 1,28 Battery Acid density 1,28 | i.o | i.o | i.o | i.o | i.o | i.o | i.o | n.i.o | n.i.o | n.i.o | n.i.o | n.i.o | n.i.o | n.i.o | n.i.o | n.i.o | n.i.o | n.i.o | n.i.o | n.i.o | n.i.o | n.i.o | n.i.o | n.i.o |
| RME / Biodiesel Plant-based methylester | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Brensflüssigkeit DOT 4 Brake fluid DOT 4 | i.o | i.o | i.o | i.o | i.o | i.o | i.o | i.o | n.i.o | n.i.o | n.i.o | n.i.o | n.i.o | n.i.o | n.i.o | n.i.o | n.i.o | n.i.o | n.i.o | n.i.o | n.i.o | n.i.o | n.i.o | n.i.o |
| Kriechmittel/ Penetrating agent | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Lengetriebeöl /power steering oil | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |

[TN: Legends in Fig. 7 (Table 7): PP – Leitung mit Bewicklung = PP cable with wrapping; Klebeband mit Bi-Komponenten Faser Acrylat = Adhesive Tape with Bicomponent Fiber Acrylate; Lagerungsdauer = Storage Time; Petrol = Fuel; all other items include translation)

FIG. 8   Tabelle 8

| Klebeband mit Bi-Komponenten Faser Synthesekautschuk | 2 x 0,35 mm² PP-Leitung mit Bewicklung | | | | | | | | | | | | | | | | | | | | | | | |
|---|---|---|---|---|---|---|---|---|---|---|---|---|---|---|---|---|---|---|---|---|---|---|---|---|
| Lagerungsdauer | 240h | | | | | | 480h | | | | | | 720h | | | | | | 1000h | | | | | |
| | 20 | 20 U | 10 | 10 U | 2 | 2 U | 20 | 20 U | 10 | 10 U | 2 | 2 U | 20 | 20 U | 10 | 10 U | 2 | 2 U | 20 | 20 U | 10 | 10 U | 2 | 2 U |
| Mechanische Belastung/ Dorn Ø in mm | i.o | i.o | i.o | i.o | i.o | i.o | i.o | i.o | i.o | i.o | i.o | i.o | i.o | i.o | i.o | i.o | i.o | i.o | i.o | i.o | i.o | i.o | 2 | 2 U |
| Mehrbereichs-Motoröl; Engine oil Shell Helix 5W40 | i.o | i.o | i.o | i.o | i.o | i.o | i.o | i.o | i.o | i.o | i.o | i.o | i.o | i.o | i.o | i.o | i.o | i.o | i.o | i.o | i.o | 10 U | i.o | i.o |
| Automatikgetriebeöl / Automatic gear box oil Liquid Moly ATF II | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Kühlerfrostschutz / radiator antifreeze 50% Ethylenglykol, 50% H₂O | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Intensivreiniger /Intensive cleaner 80% Isopropanol, 20% Polypropylenglykol | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Motorkaltreiniger engine cold cleaner | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Motorraumversiegelung/ engine compartment preservative | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Schmierfett / Lubricating grease | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Kraftstoff FAM B (DIN 51 604) Petrol acc. To DIN 51 604 | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Diesel nach DIN EN 590 Diesel fuel | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Tausalzlösung 5% Saline solution 5 % | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Batteriesäure/ Dichte 1,28 Battery Acid density 1,28 | i.o | i.o | i.o | i.o | i.o | i.o | i.o | i.o | i.o | i.o | i.o | i.o | n.i.o | n.i.o | n.i.o | n.i.o | n.i.o | n.i.o | n.i.o | n.i.o | n.i.o | n.i.o | n.i.o | n.i.o |
| RME / Biodiesel Plant-based methylester | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Bremsflüssigkeit DOT 4 Brake fluid DOT 4 | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Kriechmittel/ Penetrating agent | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |
| Lenkgetriebeöl / power steering oil | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o | i.o |

[TN: Legends in Fig. 8 (Table 8): PP – Leitung mit Bewicklung = PP cable with wrapping; Klebeband mit Bi-Komponenten Faser Synthesekautschuk = Adhesive Tape with Bicomponent Fiber Synthetic Rubber; Lagerungsdauer = Storage Time; Petrol = Fuel; all other items include translation)

ADHESIVE TAPE BASED ON A STITCH-BONDED WEB CARRIER WITH BICOMPONENT FIBERS

RELATED APPLICATIONS

This application claims priority to German Patent Application No. 10 2014 119 524.8, filed Dec. 23, 2014.

FIELD OF INVENTION

The invention relates to an adhesive tape having a carrier which includes a stitch-bonded web and an adhesive coating applied on at least one side of the carrier, wherein the stitch-bonded web contains fibers that are made entirely from polyester (PES), in particular from polyethylene terephthalate (PET), and are sewn by means of at least one sewing thread.

Under stitch-bonded web is understood a textile fiber structure consisting of several fiber layers sewn together by means of at least one sewing thread.

BACKGROUND

An adhesive tape with a carrier formed by a stitch-bonded web is known, for example, from EP 0 668 336 B2. An adhesive tape of the initially mentioned kind, which is sold under the product name "Coroplast 8550 X," is furthermore known. The known type of adhesive tape is suitable for wrapping cable sets in vehicles, in order to prevent, for example, rattling noises. Rattling noises are caused, for example, by the cables coming in contact with the car body or other parts. Adhesive tapes of the mentioned kind must meet consistent standards, in particular the standard LV 312 (10/2009), with regard to their performance characteristics. This standard classifies adhesive tapes with regard to their properties for applications in the automobile industry, preferably for bundling and wrapping cables and cable harnesses. The above-mentioned standard was developed by the representatives of the automobile manufacturers AUDI AG, BMW AG, Daimler AG, Porsche AG, and Volkswagen AG. Reference is always made to version 10/2009, which was valid at the time of the application, when standard LV 312 is mentioned in the following.

To the performance characteristics of adhesive tapes belong, for example, the adhesive strength to the back of the tape and the unrolling force as well as the manual tearability. Further performance characteristics are the adhesive strength on specific materials, the thickness, the elongation at rupture, the tear resistance, the abrasion resistance and the temperature stability.

Adhesive tapes that must have temperature stability at temperatures higher than 125° C. must be used depending in the field of application in the automobile industry. The application of PES web-based adhesive tapes at temperatures higher than 125° C. has not been possible until now due to the unavailable temperature stability. Since the operation temperature is limited to 125° C., such adhesive web tapes are preferably used in the interior of the motor vehicle. These adhesive web tapes that are used in the interior of motor vehicles likewise only have a disadvantageously moderate chemical resistance due to their high suction effect.

It is an object of the invention in one embodiment to improve the performance characteristics of the previously known adhesive tapes of the kind described in the beginning. An adhesive tape of the initially mentioned kind having a temperature stability at temperatures higher than 125° C. should be especially made available, wherein preferably also its chemical resistance is also to be improved.

BRIEF SUMMARY

The object is attained in part according to the invention by means of the features of the characterizing part of claim 1. The stitch-bonded web according to the invention therefore contains also bicomponent fibers, in addition to the fibers composed from polyester (PES).

Bicomponent fibers are chemical fibers, which are produced from two polymers with different physical and/or chemical properties. The special characteristic of bicomponent fibers arises from their crimping behavior, which is achieved through the different shrinking capability of the two components.

Different fiber structures are possible herein, for example, bicomponent fibers with two polymers arranged side by side in a fiber or bicomponent fibers with a core polymer and a core sheath polymer (centric cover core). Bicomponents configured like a multifilament are furthermore conceivable. This means that the fibers are composed from a core polymer that is encased by a core sheath polymer, wherein runners of the core polymer extend, for example, radially symmetrically with respect to the core sheath polymer in the fiber cross section. Hollow fibers with different polymers arranged as a sheath are also conceivable. The bicomponent fibers can also include a polymer fiber, in which the partial fibers of a second polymer are inhomogeneously arranged (matrix-fibril).

As materials for bicomponent fibers can be used polyesters with different melting points based on polyethylene terephthalate (PET), polybutylene terephthalate (PBT), and polytrimethylene terephthalate (PTT). Materials based on polyethylene (PE), polypropylene (PP), polyurethane (PUR), polyethylene naphthalate (PEN), and polyacrylonitrile (PAN) can also be take into consideration for these fibers.

In a preferred embodiment of the invention, the adhesive tape has temperature stability at a temperature within a range from 125° C. to 175° C. with a storage time of 240 h to 3000 h according to standard LV 312.

The adhesive tape according to standard LV 312 can especially be torn by hand. This makes possible an easy processing of the adhesive tape.

The adhesive tape advantageously has an elongation at rupture within a range from 10%, if required 20%, up to 80%, and preferably within a range from 50% to 60%.

The adhesive tape has preferably a breaking force within a range from 15 N/cm to 30 N/cm, and preferably up to 50 N/cm.

The adhesive tape has especially an adhesive application within a range from 20 g/m$^2$ to 150 g/m$^2$, preferably 30 g/m$^2$ to 100 g/m$^2$, and particularly preferably only up to 80 g/m$^2$. The surface of the PET stitch-bonded web is smoother due to the lower air permeability of the adhesive tape according to the invention with a bicomponent fiber portion in comparison to tapes having conventional web carriers without bicomponent portion and surprisingly only a clearly smaller adhesive coat is advantageously necessary to achieve the same adhesive strength.

In an advantageous embodiment of the invention, the adhesive tape has an abrasion resistance within a range from Class B to Class C according to standard LV 312.

The fibers composed of polyester (PES) preferably have a fiber length within a range from 60 mm to 120 mm.

Bicomponent fibers preferably have a fiber length within a range from 30 mm to 55 mm.

The stitch-bonded web preferably has a proportion of PES fibers within a range from 50% to 90% and accordingly a proportion of bicomponent fibers within a range from 50% to 10%.

In an advantageous embodiment of the invention, the fibers made of polyester (PES) have a fiber linear density within a range from 2.0 dtex to 4.0 dtex, and are sewn with sewing thread that can preferably have a thread thickness within a range from preferably 4.0 dtex to 60.0 dtex. The size ratio of fiber fineness to thread size is accordingly preferably within a range from 2:50 to 4:50.

The bicomponent fibers can especially have a fiber linear density within a range from 1.0 dtex to 7.6 dtex, and preferably within a range from 1.5 dtex to 5.0 dtex. The size ratio of fiber fineness to thread size is consequently preferably within a range from 1:50 to 5:50. The size ratio of the fineness of PES fibers to the fineness of bicomponent fibers is furthermore preferably about 1:1. The properties of the web can be adjusted at the same time taking into consideration the respective fiber material and the fiber length with a similarly great strength of both fiber types.

The stitch-bonded web preferably has a thickness within a range from 0.10 mm to 1.00 mm, and preferably within a range from 0.15 mm to 0.90 mm, according to the standard LV 312.

The stitch-bonded web especially has a surface weight within a range from 50 g/m$^2$ to 230 g/m$^2$, and preferably within a range from 60 g/m$^2$ to 130 g/m$^2$.

BRIEF DESCRIPTION OF THE DRAWINGS

Further advantageous embodiments of the invention arise from the following description of the figures and the dependent claims, wherein:

FIG. 5 shows an overview presented in a table (Table 5) of the results of chemical resistance tests according to LV 312 on PP cables with a conventional adhesive tape "Coroplast 8550";

FIG. 6 shows an overview presented in a table (Table 6) of the results of chemical resistance tests according to LV 312 on PP cables with a conventional standard adhesive tape "Coroplast 8550 X";

FIG. 7 shows an overview presented in a table (Table 7) of the results of chemical resistance tests according to LV 312 on PP cables with an adhesive tape according to the invention having a bicomponent adhesive tape carrier and a polyacrylate adhesive coating; and FIG. 8 shows an overview presented in a table (Table 8) of the results of chemical resistance tests according to LV 312 on PP cables with an adhesive tape according to the invention having a bicomponent adhesive tape carrier and a synthetic rubber adhesive coating.

The same parts are always provided with the same reference characters in the different figures of the drawings.

DETAILED DESCRIPTION OF THE DRAWINGS AND THE PRESENTLY PREFERRED EMBODIMENTS

Concerning the following description it is claimed that the invention is not limited to the exemplary embodiments and as a result also not to all or several of the features of the described feature combinations, but rather that each individual partial feature of the/each exemplary embodiment is of importance for the object of the invention also separately from all other partial features described in connection therewith and also in combination with any desired features of another exemplary embodiment.

The property parameters of the stitch-bonded web 2 and the adhesive tape 1 listed in the description are determined according to standard LV 312 (10/2009). To these parameters belong the thickness D1, the elongation at rupture, the breaking force, the tear resistance, the manual tearability, and the air permeability for the stitch-bonded web 2. The manual tearability will be allocated to a class in the following. The parameters belonging to the adhesive tape 1 are the thickness D2, the elongation at rupture, the breaking force, the adhesive strength on steel, the adhesive strength on the back of the tape, the unrolling force, the manual tearability, the temperature stability, the abrasion resistance, and the noise attenuation. The last two parameters will also be allocated to a class.

Figure 1:
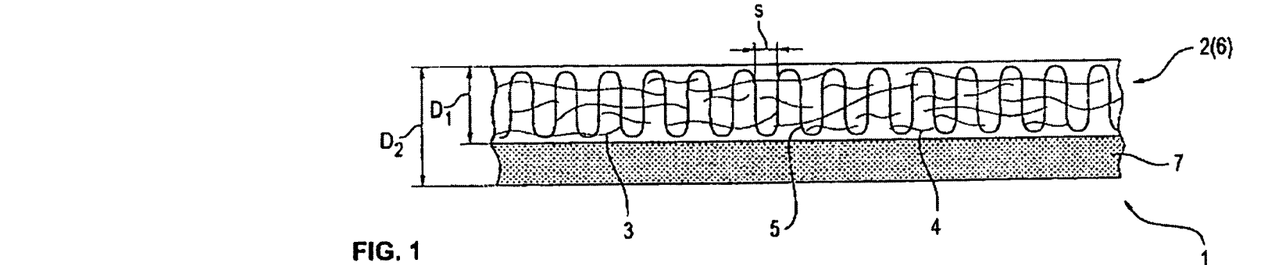
FIG. 1 shows a schematic view of an adhesive tape according to the invention with a stitch-bonded web according to the invention.

FIG. 1 shows an adhesive tape 1 according to the invention having a carrier 6 formed by a stitch-bonded web 2 and an adhesive layer 7 applied on one side of the carrier 6. The stitch-bonded web 2 preferably includes a textile web material, which is a textile fabric consisting of a sequence and/or superposition of organized and unorganized fibers 3, 4. The web material can consist of longitudinal fibers running along the running direction of the tape and transversal fibers running transversely to the longitudinal fibers or a layer of tangled fibers.

The stitch-bonded web 2 according to the invention has fibers 3 of polyester (PES), preferably of polyethylene terephthalate (PET). The stitch-bonded web 2 has preferably two fiber types, that is, PES fibers 3 and bicomponent fibers 4. The fiber linear density of the PES fibers 3 is especially within a range from 2.0 dtex to 4.0 dtex, and the fiber linear density of the bicomponent fibers 4 is especially within a range from 1.0 dtex to 7.6 dtex, and preferably from 1.5 dtex to 5.0 dtex. The PES fibers 3 and/or the bicomponent fibers 4 are preferably sewn with sewing threads 5 having a fiber linear density within a range from preferably 40.0 dtex to 60.0 dtex in order to form the stitch-bonded web 2. The sewing threads 5 are preferably sewn into the stitch-bonded web 2 with a stitch length s within a range from 0.8 mm to 1.2 mm, and preferably with a stitch length s of 1.0 mm. Under stitch length s is thus understood the distance between the entry point of the sewing thread 5 into the fiber structure and its exit point. The stitch-bonded web 2 has in particular a surface weight within a range from 70 g/m2 to 90 g/m2, and preferably within a range from 75 g/m2 to 85 g/m2. The stitch-bonded web 2 furthermore has a thickness D1 within a range from 0.10 mm to 1.00 mm, in particular within a range from 0.15 to 0.90 mm, and particularly preferably up to 0.60 mm.

Figure 3:
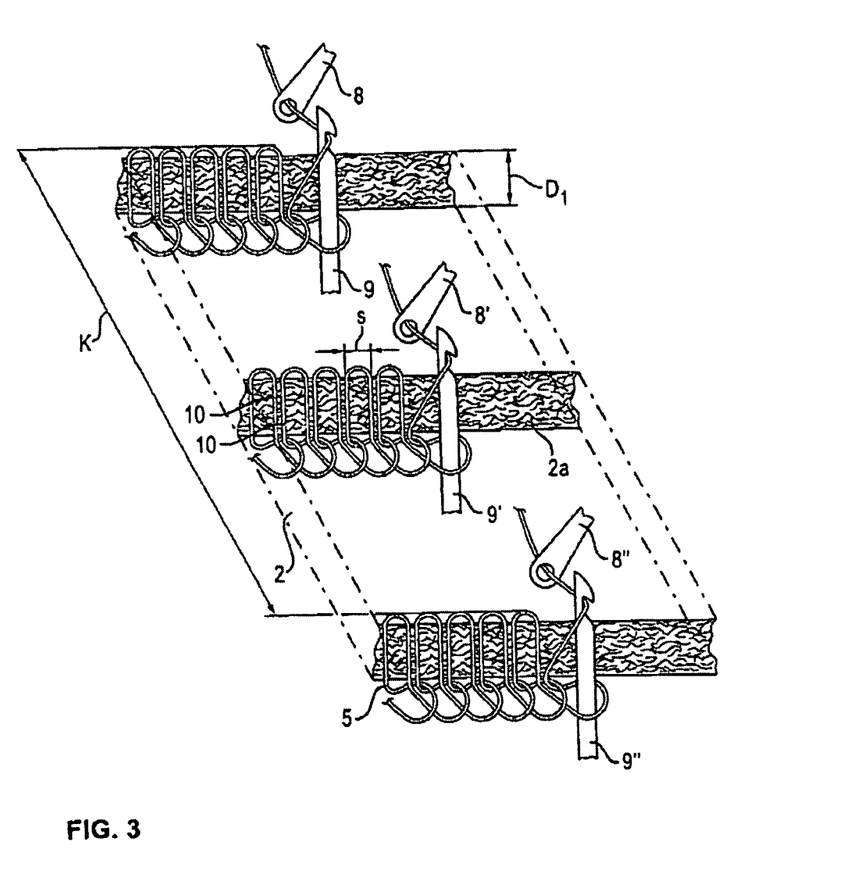
FIG. 3 shows a view of the stitch-bonded web during its manufacture.

The production of a stitch-bonded web 2 is carried out, for example, as shown schematically in FIG. 3. FIG. 3 shows a schematic of a stitch-bonded web 2, which is produced with a fineness F3 for the case in which the value of the distance K represented in FIG. 3 amounts to 25.4 mm.

The fineness F is here a measurement of the stitch density. It is based on the "English fineness," which discloses the number n of allocated sewing needles 9, 9', 9" over the distance K of one English inch (25.4 mm) and thus the stitch density in a numbering system used for knitting frames and knitting machines. In the stitch-bonded web 2 represented schematically in FIG. 3 were used, for example, at least n=3 needles 9, 9', 9" arranged over a distance K for the production of the stitch-bonded web 2. The English fineness is standardized in DIN ISO 8188:2009-02, "Textile Machinery and Accessories—Pitches of Knitting Machines." Finenesses within a range from F 14 to F 24, in particular a fineness of F 22, are preferred according to the invention.

Two sewing thread systems (that is, two bars) are used, for example, for the production of a stitch-bonded web 2 in order to configure stitches through a raw web 2a. It is also possible, however, to also use single bar or three-bar systems. A sewing thread 5 is guided over the width of the raw web 2a by means of a first set of movable sewing thread guides 8, 8', 8" in the two-bar system, which are supported by a first guide bar (not shown), for a coacting full thread engagement with the needles 9, 9', 9", et cetera.

In order to produce the stitches in the stitch-bonded web 2, the sewing thread 5 is moved during operation meshing with the needles 9, 9', 9", which in turn guide the sewing thread 5 in a back and forth manner through the raw web 2a. An arrangement of coacting sewing thread stitches 10, which extends in mutually spaced rows along the raw web 2a, is configured in this way.

Only as an example, and not limited to this, the coacting sewing thread stitches 10 can be held in a full chain stitch configuration, even though other known stitch arrangements, for example, tricot stitches and the like, can likewise be used.

The stitch-bonded web 2 can be especially produced with the "Maliwatt" knitting technology. According to the Maliwatt process, a raw web 2a is reinforced in that said web, which is configured, for example, as a produced cross-paneled card web or a tangled web, is sewn by means of one or two thread systems. For this purpose, a compound needle and lock wire system penetrates the fiber web and pulls one or two inserted sewing threads 5 through the raw web 2a that is to be reinforced during the backward movement. The reduction of the previous stitch and the pulling of the product downward follow.

The thread material of the sewing thread 5 can consist in part or entirely of textile fibers. Yarns can be used, for example, while yarns of staple fibers or filaments can be used. A staple fiber yarn consists of finite long fibers, which are twisted during spinning. A filament yarn consists of filaments. A filament is a fiber with an unlimited length (according to standard DIN 60000 (10/1990)) or a length of at least 1000 mm (according to standard DIN 60001 (10/1990)). Fibers with limited length are instead called spinning fibers. Spinning fibers are in turn divided into actually spinnable staple fibers and very short flock fibers, wherein the limit is 15 mm. Sewing threads 5 can also be produced from spinning fibers. Smooth yarns, in particular so-called pre-oriented yarns (POY) or so-called fully drawn yarns (FDY) are used for the sewing threads 5.

The production of a filament yarn is carried out by swirling the individual filaments. The sewing threads 5 can contain in particular 24 to 144 filaments. The number of filaments is preferably within a range from 34 to 38. The properties of an exemplary embodiment of the stitch-bonded web 2 are shown in the following Table 1, column 4.

The specification "PES virgin" in Table 1 for the material of the fibers 3, 4 and the sewing thread 5 means here that the fibers 3, 4 and the sewing thread 5 are preferably composed in part or entirely of non-recycled polyester.

The sewing threads 5 can be composed in part or entirely of recycled or non-recycled polyester (PES), polyamide (PA), polyethylene (PE), or polypropylene (PP) or of polyurethane (PUR).

Figure 2A:
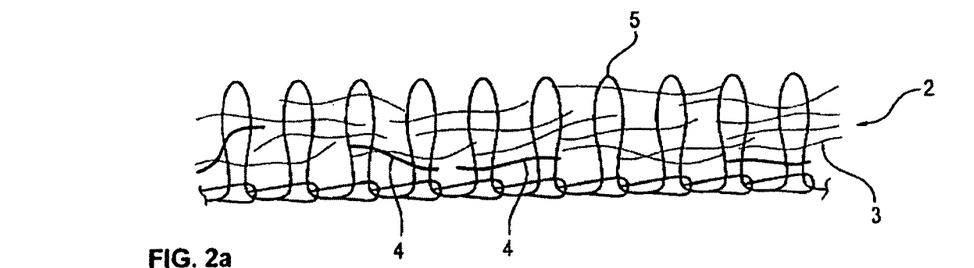
FIG. 2a shows a schematically represented view of an embodiment of a stitch-bonded web with long fibers according to the invention.
Figure 2B:
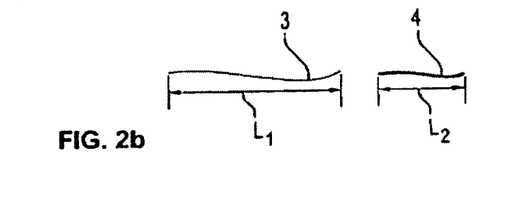
FIG. 2b shows a view of a long fiber having length L1 and a short fiber having length L2 of the stitch-bonded web.

The PES fibers 3 are present in a proportion within a range from 50% to 90% and the bicomponent fibers 4 are accordingly present in a proportion within a range from 50% to 10% in the stitch-bonded web 2 used as carrier according to the invention. The length of the PES fibers 3 ("fiber 1") is within a range from 60 mm to 120 mm. The bicomponent fibers 4 ("fiber 2") have a length within a range from 30 mm to 55 mm.

The stitch-bonded web 2 furthermore has an elongation at rupture within a range from 13% to 25% and a breaking force within a range from 20 N/cm to 32 N/cm. The breaking force is here a measurement of the loading capacity of the adhesive tape 1 during use. The elongation at rupture is a measurement of the tensile strength of the adhesive tape 1. The tear propagation strength (MV=mean value) amounts to 10,000 mN. The tear propagation strength or notch rupture strength is the property of a fabric of not continuing to tear, even with the presence of a notch. It correlates with the manual tearability.

TABLE 1

Overview of Carrier Materials

| Parameter | Unit | Standard PET Stitch-bonded Web 80 g/m² | Pursuant to the Invention with Bicomponent Fibers |
|---|---|---|---|
| Fineness | n/25 mm | F 22 | F 22 |
| Thread strength | dtex | 50 | 50 |
| Filament count | quantity | 36 | 36 |
| Stitch length | mm | 1.0 | 1.0 |
| Thread material | — | PES virgin | PES virgin |
| Fiber material PES fiber | — | PES virgin | PES virgin |
| Fiber material bicomponent fiber | — | | two polymers |
| Fiber strength PES fiber | dtex | 2.1 | 2.0-4.0 |
| Fiber strength bicomponent fiber | dtex | | 1.0-5.0 |
| Proportion PES fibers | % | 100 | 50-90 |
| Proportion bicomponent fibers | % | 0 | 10-50 |
| Fiber length fiber 1 | mm | 76 | 60-120 |
| Fiber length fiber 2 | mm | 51 | 30-55 |
| Surface weight | g/m² | 8 +/− 5 | 80 +/− 5 |
| Thickness | mm | 0.175 +/− 0.015 | 0.15 +/− 0.03 |
| Elongation at rupture | % | 15-35 | 20-80 |
| Breaking force | N/cm | 25-40 | 15-30 |
| Tear propagation | mN | MV 13,000 | MV 10,000 |
| Manual tearability | LV 312 | easy | very easy |
| Air permeability | l/m² *s | 2500-3000 | 1000-2000 |

The stitch-bonded web 2 is very easy to tear by hand. The air permeability is especially within a range from 300 l/m2s to 2500 l/m2s, and preferably within a range from 400 l/m2s to 2000 l/m2s. This depends on the used bicomponent fiber proportion.

Figure 4:
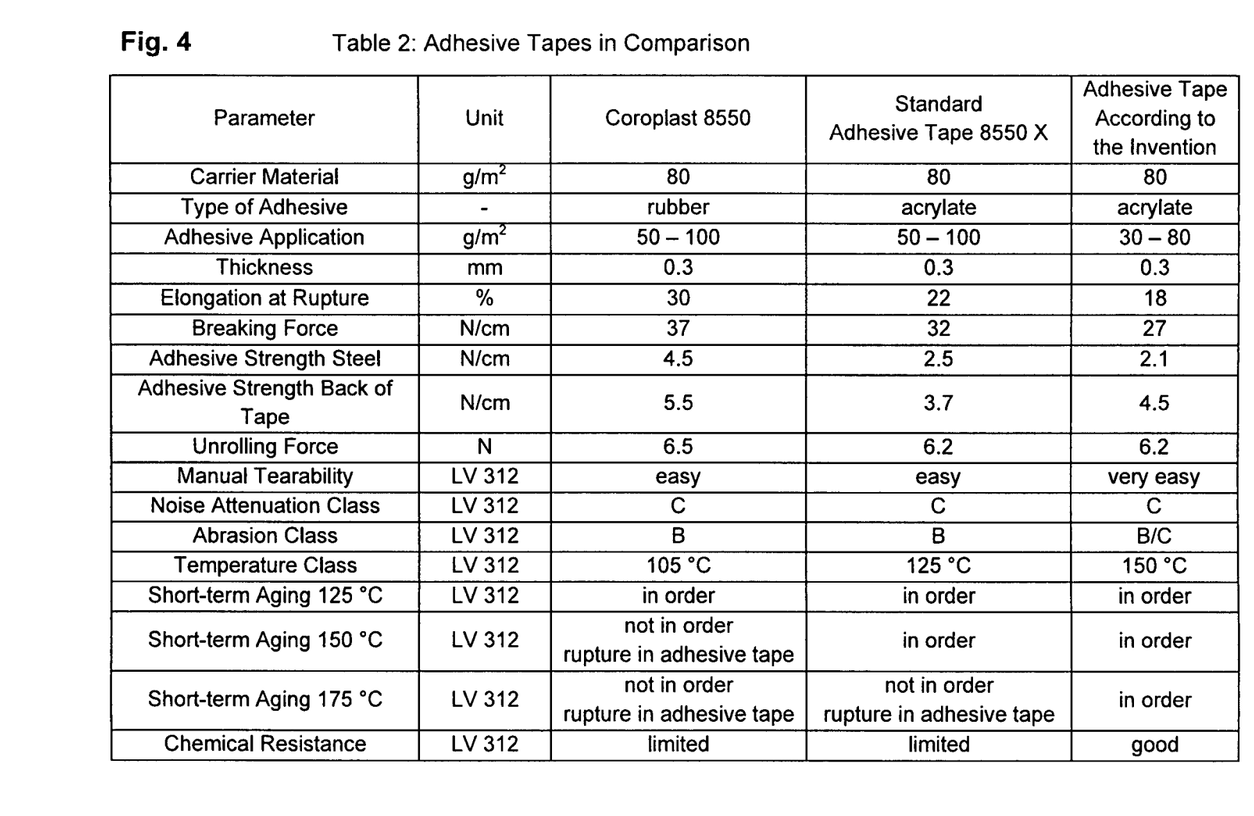
FIG. 4 shows an overview presented in a table (Table 2) of the properties of conventional adhesive tapes in comparison to an adhesive tape according to the invention.

The use of a stitch-bonded web 2 as carrier 6 preferably leads to an adhesive tape 1 with the properties shown in comparison to the conventional adhesive tapes in Table 2 (FIG. 4) in column 5. The features listed in the table are essential to the invention individually and separately or in any desired combination.

The adhesive layer 7 of the adhesive tape 1 according to the invention preferably includes pressure-sensitive adhesives, based in particular on polyacrylate, which can be used due to their good aging resistance. These acrylate adhesives can be applied, as a rule, either as dispersions or as melt adhesives to be crosslinked by means of UV radiation. The use of solvent acrylates or, however, the use of acrylate monomer mixtures or acrylate prepolymers is basically also possible. The latter are, if required, polymerized and crosslinked after coating, either thermally or by means of UV radiation. The use of other pressure-sensitive adhesive classes, such as, for example, adhesives based on synthetic rubber, such as SIS (styrene-isoprene-styrene copolymers) or SBS (styrene-butadiene-styrene block copolymers) or of adhesives based on silicone or polyurethane is furthermore possible.

An application of adhesive on the stitch-bonded web carrier 6 within a range from 30 g/m2 to 80 g/m2 is especially necessary for the production of the adhesive tape 1. The adhesive tape 1 furthermore has an elongation at rupture of 18% and a breaking force of 27 N/cm. The adhesive strength on steel additionally amounts to 2.1 N/cm; the adhesive strength to the back of the tape is 4.5 N/cm.

The adhesive tape 1 produced with the stitch-bonded web 2 has an unrolling force of 6.2 N/cm. The unrolling force is the force needed to unroll an adhesive tape roll. It acts on the winding traction during bandaging of cable harnesses, which has an effect, for example, on the winding tightness of a cable loom. If excessively high forces are needed to unroll the tape, this can have as a consequence a twisting and thus a shortening, in particular of thin cable bundles. If excessively low forces are needed to unroll the tape, this can lead to processing problems and additionally soft cable bundles with unclean, sagging windings.

The noise attenuation of the adhesive tape 1 further corresponds to class C, and the abrasion resistance is within a range from class B to class C. An overview of these abrasion classes according to standard LV 312 (10/2009) is shown in the following Table 3, and an overview of the noise attenuation classes according to standard LV 312 (10/2009) is shown in the subsequent Table 4.

The temperature stability of the adhesive tape 1 is preferably at least at 125° C., and preferably within a range from 150° C. to 175° C.

TABLE 3

Classification of the Abrasion Properties According to LV 312 (10/2009)

| Abrasion Class | Requirement |
| --- | --- |
| A no abrasion protection | <100 strokes |
| B low abrasion protection | 100-499 strokes |
| C average abrasion protection | 500-999 strokes |
| D high abrasion protection | 1000-4999 strokes |
| E very high abrasion protection | 5000-14,999 strokes |
| F extremely high abrasion protection | 15,000-29,999 strokes |
| G abrasion protection for special applications | ≥30,000 strokes |

TABLE 4

Classification of the Noise Attenuating Properties According to LV 312 (10/2009)

| Abrasion Class | Requirement |
| --- | --- |
| A no noise attenuation | 0 to ≤2 dB(A) |
| B low noise attenuation | >2 to ≤5 dB(A) |
| C average noise attenuation | >5 to ≤10 dB(A) |
| D high noise attenuation | >10 to ≤15 dB(A) |
| E very high noise attenuation | >15 dB(A) |

Chemical resistance tests, which were carried out on PP cables with regard to the mechanical strain, media use and test duration according to the regulations pursuant to LV 312, as can be seen in Tables 5, 6, 7 and 8 (FIGS. 5 through 8), furthermore showed that the bicomponent fiber web 2 used as adhesive tape carrier 6—equipped with an adhesive layer 7 of polyacrylate (Table 7), as well as also with an adhesive layer 7 of synthetic rubber (Table 8)—displays a surprisingly clearly better media resistance than the known adhesive tape "Coroplast 8550" (Table 5) and the known standard product "Coroplast 8550 X" (Table 6). The abbreviation "i. o." in the tables means respectively "in order" or "media resistance test passed," the abbreviation "n. i. o." means respectively "not in order" or "media resistance test not passed."

While the above description constitutes the preferred embodiment of the present invention, it will be appreciated that the invention is susceptible to modification, variation and change without departing from the proper scope and fair meaning of the accompanying claims.

The invention claimed is:

1. An adhesive tape having a carrier comprising a stitch-bonded web and an adhesive coating applied on at least one side of the carrier, wherein the stitch-bonded web contains fibers composed from polyester (PES) and sewn together by means of at least one sewing thread,
  the stitch-bonded web comprising bicomponent fibers in addition to the fibers composed from polyester (PES),
   wherein the fibers and the bicomponent fibers are members selected from the group consisting of: fibers running along a longitudinal direction of the tape, fibers running along the longitudinal direction and transverse thereto, and fibers forming tangled fibers;
   wherein the sewing thread is sewn through the fibers and the bicomponent fibers.

2. The adhesive tape according to claim 1, wherein the adhesive tape has a temperature stability within a range from 125° C. to 175° C. according to standard LV 312.

3. The adhesive tape according to claim 1, wherein the adhesive tape meets standard LV 312 for hand tearability and for a breaking force less than 90 N/cm.

4. The adhesive tape according to claim 1, wherein the adhesive tape has an elongation at rupture within a range from 10% to 80%.

5. The adhesive tape according to claim 1, wherein the adhesive tape has a breaking force within a range from 15 N/cm to 30 N/cm.

6. The adhesive tape according to claim 1, wherein the adhesive coating of the adhesive tape has an adhesive application within a range from 20 $g/m^2$ to 150 $g/m^2$.

7. The adhesive tape according to claim 1, wherein the adhesive tape has an abrasion within a range from class B to class C according to standard LV 312.

8. The adhesive tape according to claim 1, wherein the fibers composed of polyester (PES) have a fiber length within a range from 60 mm to 120 mm.

9. The adhesive tape according to claim 1, wherein the bicomponent fibers have a fiber length within a range from 30 mm to 55 mm.

10. The adhesive tape according to claim 1, wherein the stitch-bonded web has a proportion of fibers composed of polyester (PES) within a range from 50% to 90% and accordingly a proportion of bicomponent fibers within a range from 50% to 10%.

11. The adhesive tape according to claim 1, wherein the fibers composed from PET have a fiber linear density within a range from 2.0 dtex to 4.0 dtex.

12. The adhesive tape according to claim 1, wherein the bicomponent fibers have a fiber linear density within a range from 1.0 dtex to 7.6 dtex.

13. The adhesive tape according to claim 1, wherein the stitch-bonded web has a thickness ($D_1$) within a range from 0.10 mm to 1.00 mm measured under a surface pressure of 1.8 kPa-2.2 kPa according to standard LV 312.

14. The adhesive tape according to claim 1, wherein the stitch-bonded web has a surface weight within a range from 50 g/m² to 230 g/m².

15. The adhesive tape according to claim 1, wherein the stitch-bonded web has an air permeability within a range from 300 l/m²s to 2500 l/m²s.

* * * * *